(12) United States Patent
Petricevic et al.

(10) Patent No.: US 6,503,655 B1
(45) Date of Patent: Jan. 7, 2003

(54) GAS DIFFUSION ELECTRODE AND ITS PRODUCTION

(75) Inventors: Raino Petricevic, Würzburg (DE); Jochen Fricke, Gerbrunn (DE); Rainer Leuschner, Grossenseebach (DE); Matthias Lipinski, Wappingers Fall, NY (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/575,058

(22) Filed: May 19, 2000

Related U.S. Application Data

(63) Continuation of application No. PCT/DE98/03417, filed on Nov. 18, 1998.

(30) Foreign Application Priority Data

Nov. 19, 1997 (DE) .......................................... 197 51 297

(51) Int. Cl.[7] .............................................. H01M 4/86
(52) U.S. Cl. .............................. 429/42; 429/40; 429/44; 204/283; 204/284; 423/445 R; 423/447.1; 423/447.2; 423/447.4; 423/447.9; 502/101; 502/416; 502/418; 502/420; 428/304.4; 428/311.7; 428/474.7; 428/480; 521/64; 521/181
(58) Field of Search ................................. 204/674, 283, 204/284; 429/40, 42, 44; 423/445 R, 447.1, 447.2, 447.4, 447.9; 502/101, 418, 416, 420; 521/64, 181; 428/304.4, 311.7, 474.7, 480

(56) References Cited

U.S. PATENT DOCUMENTS 5,260,855 A 11/1993 Kaschmitter et al. ....... 361/502
5,925,230 A * 7/1999 Fajt et al. .................... 204/666
5,932,185 A * 8/1999 Pekala et al. ........... 423/445 R

FOREIGN PATENT DOCUMENTS

DE 195 23 382 A1 1/1997

OTHER PUBLICATIONS

Published International Application No. WO 93/14511 (Kaschmitter et al.), dated Jul. 22, 1993.
Published International Application No. WO 95/06002 (Pekala et al.), dated Mar. 2, 1995, as mentioned on p. 4 of the specification.
Published International Application No. WO 99/01502 (Dröge), dated Jan. 14, 1999.
"Novel Forms of Carbon" (Renschler et al.), dated 1992, Materials Research Society, vol. 270, pp. 1–14, as mentioned on p. 2 and 3 of the specification no month available.
"Highly porous carbon sheets" (Iwaki et al.), dated Jan. 21, 1987, 6001 Chemical Abstracts, Columbus, Ohio, US, vol. 106, one page.
"Carbon foam thermal insulator and its manufacture" (Uno), dated Aug. 22, 1987, 6001 Chemical Abstracts, Columbus, Ohio, US, No. 6, one page.

* cited by examiner

Primary Examiner—Bruce F. Bell
(74) Attorney, Agent, or Firm—Laurence A. Greenberg; Werner H. Stemer; Gregory L. Mayback

(57) ABSTRACT

A thin, flat, and porous carbon gas diffusion electrode having a side in contact with a supply of gas and a side in contact with an electrolyte, comprises a pyrolysis product of a composite of an organic aerogel or xerogel and a reinforcing skeleton consisting at least in part of organic material. The porosity of the carbon gas diffusion electrode according to the invention can be regulated at will while the surface of the electrode is smooth.

30 Claims, No Drawings

GAS DIFFUSION ELECTRODE AND ITS PRODUCTION

CROSS-REFERENCE TO RELATED APPLICATION

This is a continuation of copending international application PCT/DE98/03417, filed Nov. 18, 1998, which designated the United States.

BACKGROUND OF THE INVENTION

Field of the Invention

The invention relates to a gas diffusion electrode comprising carbon and to a process for producing it.

Gas diffusion electrodes are used, in particular, in batteries and especially in fuel cells such as PEM fuel cells (PEM=polymer electrolyte membrane). In fuel cells, for example, the energy stored chemically in hydrogen and oxygen which would be released in a hydrogen-oxygen reaction, can be converted into electrical energy by means of an electrochemical process which represents a reversal of the electrolysis of water.

PEM fuel cells have a central membrane/electrode unit comprising a thin, proton-conducting solid state electrolyte on both sides of which very smooth, hydrophobic, porous gas diffusion electrodes having a catalyst coating are located. Oxygen is fed to the electrode on the cathode side while hydrogen is fed to the electrode on the anode side. An electron exchange takes place on the catalyst-coated surfaces of the electrodes, as a result of which an electric potential is built up. On the cathode side, water is formed as reaction product of the electrochemical process.

The electrodes have to meet the following requirements: good electrical conductivity, good gas permeability and mechanical stability; in addition, they should have a smooth outer surface. A smooth surface is very important because this gives the best possible contact, and thus a low electrical contact resistance, between electrode, catalyst and electrolyte. The electrodes should therefore have a surface roughness which is at most in the micron range. To make sufficient gas flow possible, the permeability of the electrodes for nitrogen should be $>10^{-6}$ m$^2$/s at atmospheric pressure, preferably $>10^{-5}$ m$^2$/s. For this purpose, the largest pores should have a diameter of $>100$ nm, preferably from 0.5 to 10 $\mu$m. It is also important for the electrodes to have a hydrophobic character, since this prevents the water formed in the electrochemical reaction between hydrogen and oxygen from accumulating in the pores and blocking them.

In order to meet the abovementioned requirements, modified carbon papers, i.e. carbon papers which are densified on the surface by means of carbon black or graphite, are used in gas diffusion electrodes. However, these materials are not satisfactory in respect of surface smoothness and pore size.

U.S. Pat. No. 5,260,855 discloses the use of electrodes made of carbon foam in supercapacitors; the carbon foam can be an aerogel or a xerogel. Such electrodes also do not satisfy the abovementioned requirements. To increase the electrical conductivity, a carbon matrix is integrated into the aerogel For this purpose, the carbon matrix, for example in the form of carbon fibers, is introduced into the gel before gelation and pyrolysis. Since aerogel and carbon matrix display different shrinkage behavior during pyrolysis, microcracks are formed. The pyrolyzed aerogel thus looses some of its adhesion to the surface of the carbon matrix. The pore size of the electrodes, which is determined by the matrix material, can therefore not be precisely set and reproduced; in addition, the surface of the electrodes is greatly roughened during the pyrolysis.

Carbon aerogels produced from aerogels based on organic compounds by pyrolysis (see: R. W. Pekala, C. T. Alviso, Materials Research Society 1992 Spring Meeting San Francisco, April 1992, Proceedings 270 (1992), page 3) do have, owing to their high porosity, properties which allow their use in gas diffusion electrodes, but since they are naturally brittle they have to be mechanically stabilized for this purpose. However, the support skeletons in the form of carbon fibers (WO 95/06002) or inorganic fiber material comprising aluminum oxide, silicon dioxide or zirconium dioxide (DE 195 23 382 A1) which have hitherto been used for this purpose meet the condition of a matched coefficient of expansion only unsatisfactorily, since these materials are not able to follow the strong shrinkage of the organic aerogel precursor. This results in defects and cracks between the fibers and the aerogel; microscopically, the thin, flat carbon aerogels therefore appear wavy.

SUMMARY OF THE INVENTION

It is accordingly an object of the invention to provide a gas diffusion electrode, and a process for its production, that overcome the above-mentioned disadvantages of the prior art devices and methods of this general type, which is made of carbon having a smooth surface and in which the porosity can be regulated at will and in which no problems occur as a result of cracks between the electrode material and a supporting skeleton.

With the foregoing and other objects in view, there is provided, according to the invention, a thin, flat, and porous carbon gas diffusion electrode having a side in contact with a supply of gas and a side in contact with an electrolyte, comprising a pyrolysis product of a composite of an organic aerogel or xerogel and a reinforcing skeleton consisting at least in part of organic material. The porosity of the carbon gas diffusion electrode according to the invention can be regulated at will while the surface of the electrode is smooth.

With the foregoing and other objects in view, there is also provided, according to the invention, a method of producing a thin, flat, and porous carbon gas diffusion electrode comprising the steps of providing carbonizable composite of an organic aerogel or xerogel and a reinforcing skeleton consisting at least in part of organic material, and pyrolyzing the composite under a protective gas, preferably at a temperature in the range from 600° C. to 2000° C.

With the foregoing and other objects in view, there is further provided, according to the invention, a novel carbonizable composite affording upon pyrolysis a porous carbon electrode, comprising an organic aerogel or xerogel and a reinforcing skeleton consisting at least in part of organic material, such that the volumetric shrinkage upon pyrolysis of the organic aerogel or xerogel and the reinforcing skeleton are within plus or minus 10% of one another.

The gas diffusion electrode of the invention, which is porous and has an extremely smooth surface, can be flat and thin, since it has been found that the porous, thin, flat characteristics of the reinforcing skeletons are largely preserved during pyrolysis according to this invention.

For applications in the field of fuel cells, the gas diffusion electrode also has to be hydrophobic. In order to achieve this, it is additionally hydrophobicized after pyrolysis.

The reinforcing skeleton which serves to stabilize the aerogel or xerogel consists at least partially of organic material. This generally means that at least 80% of the reinforcing skeleton is organic material. Inorganic components can be, for example, glass fibers or flame retardants such as boron-containing salts. The organic material of the reinforcing skeleton has comparable shrinkage (volume shrinkage) to the aerogel or xerogel during pyrolysis, such that the shrinkage of the aerogel or xerogel and that of the reinforcing skeleton are within plus or minus 10% of one another, and the skeleton is, after pyrolysis, still so strong that it can assume a support function for the pyrolyzed aerogel or xerogel.

It is advantageous for the reinforcing skeleton to be readily wettable by the aerogel or xerogel. For this purpose, the organic material preferably contains substructures which can form hydrogen bonds. These are, in particular, functional groups such as OH, OR, CO, COOH, COOR, CN, $NH_2$, NHR, $NR_2$, $CONH_2$, CONHR, $CONR_2$, CO—NH—CO and CO—NR—CO. Hydroxyl and carboxamide groups have been found to be particularly advantageous.

The gas diffusion electrode of the invention displays significant improvements over known electrodes. This is attributable to the use of a reinforcing skeleton comprising organic material, which, during production of the electrode, forms, together with the aerogel or xerogel, a completely new structure, depending on the type and porosity of the reinforcing skeleton.

Organic materials used for the reinforcing skeleton are preferably cellulose, polyamides, in particular aromatic polyamides (aramids), polyesters and phenolic resins such as phenol/formaldehyde resins, in particular novolaks. However, for example, the following materials are also possible: polymethyl methacrylate, polyacrylonitrile, polyurea, polyurethane, paper and viscose staple fibers. The reinforcing skeleton itself can be in the form of porous membranes, e.g. porous filter material, or flexible nonwovens and woven fibers.

The reinforcing skeleton can advantageously have a pore radius gradient. This can be achieved in a simple way by, for example, organic membranes having different pore sizes being arranged next to one another and joined to one another, for example by adhesive bonding. The pore radius gradient (in the electrodes), where the electrodes on the electrolyte side have a finer pore structure than on the gas supply side, increases the rate at which the water is transported away and accordingly improves the performance of the fuel cell. In such a reinforcing skeleton, the more coarsely structured membrane also serves to provide additional mechanical stabilization of the aerogel or xerogel and the fine-pored carbon layer formed therefrom. Pore size, surface smoothness and mechanical stability can thus be adjusted in a simple and targeted manner via the reinforcing skeleton.

Aerogels and xerogels used are, in particular, those based on resorcinol and formaldehyde (as monomers). However, apart from resorcinol (1,3-dihydroxybenzene), it is also possible to use other phenolic compounds, for example phenol itself and the other dihydroxybenzenes, i.e. catechol and hydroquinone, and also trihydroxybenzenes such a pyrogallol and phloroglucine, as well as bisphenol A. The phenolic ring can also bear further substituents, for example alkyl groups, substituted alkyl groups such as $CH_2OH$ and carboxyl groups, i.e. it is possible to use, for example, compounds such as alkylphenols and dihydroxybenzoic acids. In place of the phenolic component, it is also possible to use compounds such as melamine. The formaldehyde can be replaced by other aldehydes, for example by furfural ($\alpha$-furfuryl aldehyde).

The gas diffusion electrode of the invention is advantageously produced by impregnating the reinforcing skeleton with a basic solution of monomers ("monomer solution") which can be converted into an aerogel or xerogel in such quantities that the proportions of aerogel or xerogel and reinforcing skeleton in the resulting structure are in the range from 9:1 to 1:9 by weight, preferably from 4:1 to 1:4 by weight. The electrode precursor is then gelled and aged, followed by drying and pyrolysis under protective gas. If necessary, hydrophobicization is subsequently carried out.

During gelling and during pyrolysis, an interaction between the monomer solution and the organic material of the reinforcing skeleton can occur. Thus, gelling can be accelerated by the organic material in a similar way to the effect produced by a catalyst. As a consequence, cluster aggregation or solution-gel polymerization occurs more quickly and significantly finer structures are therefore formed. This effect is greater, the stronger the interaction between the reinforcing skeleton and the gel.

In the case of very hydrophilic organic materials (for the reinforcing skeleton), e.g. cellulose, having some reactive functional groups on the skeleton surface, molecular addition of organic groups of the gel to the skeleton surface occurs, so that the latter is very effectively coated. This finally leads to a very stable electrode structure, although the individual components do not have these properties to this extent.

In the case of reinforcing skeletons made of nonwoven organic fiber material, e.g. aramid, having little pronounced hydrophilic character, it is not only molecular addition of the organic groups of the gel to the reinforcing skeleton which occurs. Rather, under the action of the fibers, a fine-pored gel network with pores having a diameter as small as 10 nm is additionally formed. Gas diffusion electrodes having such a fiber structure likewise have a very smooth and homogeneous outer surface.

Apart from the advantage that the reinforcing skeleton comprising organic material is readily wetted by the monomer solution, which makes its processing easier and has an advantageous effect on the structure and thus the properties, e.g. pore size, of the resulting aerogel or xerogel, a further advantage of such a support skeleton shows up in the pyrolysis. The organic material has comparable shrinkage properties to those of the aerogel or xerogel and as a result of this warping and cracks, i.e. tearing of the aerogel or xerogel away from the organic membrane or fiber material, during pyrolysis are avoided, so that homogeneous and smooth surfaces are obtained.

The essential and fundamental difference between support skeletons made of formatted carbon fabrics or inorganic fibers corresponding to the prior art and reinforcing skeletons of organic material is thus that the organic materials have a similar shrinkage behavior to that of the organic aerogels and xerogels. This could be due to the organic materials being subjected to a transformation process similar to that of aerogels and xerogels during pyrolysis. This property is important because it results in both the bond between aerogel or xerogel and reinforcing skeleton and the smooth outer surface being retained during pyrolysis. This is achieved by cracks which can occur during pyrolysis due to the different tensile forces between reinforcing skeleton and aerogel or xerogel being effectively avoided by the joint shrinkage and by the good coupling of the aerogel or xerogel to the organic reinforcing skeleton. In contrast to inorganic support skeletons, an intimate bond between the pyrolyzed aerogel or xerogel and the pyrolyzed reinforcing skeleton is retained after pyrolysis in this case. This also leads to an additional improvement in the surface smoothness.

In addition, the use of a reinforcing skeleton comprising organic material enables the production of the gas diffusion electrodes to be simplified to such an extent that mass production is achievable. The production process is particularly simplified in the case of electrodes where paper-like, very hydrophilic membranes, for example of cellulose or polyamide, are used as reinforcing skeleton. Owing to the high absorbency of such membranes, troublesome inclusions of air are virtually ruled out in the production of the electrodes.

Specifically, the production of thin, flat, porous, hydrophobic gas diffusion electrodes according to the invention is in principle carried out as follows. The respective reinforcing skeleton is impregnated with a solution of the monomers, preferably resorcinol and formaldehyde. A base, preferably sodium carbonate, is employed as catalyst for the conversion into the aerogel or xerogel. The impregnated reinforcing skeleton is then laid on a planar substrate, preferably a glass plate, and covered with a further glass plate, so that the material cannot dry out during gelling. The material remains in this form for some time while gelling and aging occur. This preferably occurs at a temperature rising slowly from room temperature to about 90° C.

Before drying the gel, the liquid remaining in the pores, mainly water, is advantageously replaced by a liquid having a low surface tension, preferably acetone. In the case of reinforcing materials which are attacked by acetone, another solvent can be used, for example ethanol. In the case of such a procedure, the shrinkage caused by drying can be drastically reduced and the formation of cracks in the reinforcing skeleton/gel composite can be avoided. However, in some cases this procedure is not critical, so that liquid replacement can be omitted.

Drying (of the composites) is preferably carried out subcritically, i.e. the remaining liquid in the pores is allowed to evaporate under atmospheric pressure; this is advantageously carried out at elevated temperature, in particular at about 50° C. However, supercritical drying is also an alternative. Here, the material is, for example, treated with carbon dioxide in an autoclave. As a result, the liquid in the pores is displaced by supercritical carbon dioxide which is subsequently vaporized slowly. Drying by either method affords a carbonizable composite according to the invention.

The subsequent pyrolysis is preferably carried out at a temperature of from 600 to 2000° C., under protective gas (in particular argon or nitrogen), in a reducing atmosphere (in particular hydrogen or methane) or under reduced pressure. During pyrolysis, the organic constituents of the aerogel or xerogel and those of the reinforcing skeleton are converted into carbon. Here, it is advantageous to load the composites with sufficiently temperature-stable, inert materials, preferably ceramics, in order to avoid distortion. The matched shrinkage of the organic reinforcing skeleton then results in thin, stabilized electrode materials having a surface smoothness not achieved in the past.

The hydrophobicization of the electrode materials produced in the above-described manner, which hydrophobicization is necessary for the use of these materials in fuel cells, is preferably carried out by means of silylation (of the internal surface). For this purpose, the electrodes are, for example, impregnated with a solution of trimethylchlorosilane or treated with gaseous trimethylchlorosilane. In place of silylation, hydrophobicization can also be carried out using a perfluorinated polymer. For this purpose, the electrodes are, for example, impregnated with a solution of a copolymer of perfluoro-2,2-dimethyldioxole and tetrafluoroethylene.

The invention is illustrated by the examples.

EXAMPLE 1

10 g of a 40% strength formaldehyde solution are mixed with 7.3 g of resorcinol, and to this are added 0.9 g of a 0.0992N sodium carbonate solution and 19.55 g of water. This solution is used to impregnate a cellulose membrane (mean pore diameter: about 1 $\mu$m) which is then, according to the sandwich principle, laid between two parallel, planar glass plates and stored in a closed container with exclusion of air for about 24 hours at room temperature. After further storage for about 24 hours at about 50° C., the specimen gels. The specimen is then allowed to age for from 1 to 3 days at a temperature of about 90° C., and the liquid in the pores, i.e. the water, is subsequently replaced by acetone. The specimen is then dried subcritically at a temperature of about 50° C., resulting in evaporation of the liquid present in the pores to give a xerogel. The dried specimen is subsequently pyrolyzed at about 1050° C. in an argon atmosphere (duration: about 2 hours). The subsequent hydrophobicization is carried out by firstly exposing the specimen to a saturated water vapor atmosphere for about 24 hours at about 90° C. This procedure is repeated in a saturated trimethylchlorosilane atmosphere, and the specimen is then dried at about 90° C.

Such a procedure gives a hydrophobic, mechanically stable gas diffusion electrode having a pore diameter of about 1 $\mu$m. The surface roughness of the electrode is of the same order of magnitude.

EXAMPLE 2

15 g of a 40% strength formaldehyde solution are mixed with 10.99 g of resorcinol, and to this are added 4.035 g of a 0.0992N sodium carbonate solution and 3.975 g of water. This solution is used to impregnate a coarse-pored cellulose filter (mean pore diameter: about 10 $\mu$m) which is then, according to the sandwich principle, laid between two parallel, planar glass plates and stored in a closed container with exclusion of air for from 1 to 2 days at room temperature; this results in gelling of the specimen. The specimen is then allowed to age for from 1 to 3 days at a temperature of from about 50 to 90° C., and the liquid in the pores, i.e. the water, is subsequently replaced by acetone. The specimen is then dried subcritically at a temperature of about 50° C., resulting in evaporation of the liquid present in the pores to give a xerogel. The dried specimen is subsequently pyrolyzed at about 1800° C. in an argon atmosphere (duration: about 1 hour).

The subsequent hydrophobicization is carried out by impregnating the specimen with a 6% strength solution of a copolymer of perfluoro-2,2-dimethyldioxole and tetrafluoroethylene in perfluorodecane. After allowing the excess solution to drip off, the specimen is dried and cured by means of thermal treatment as follows: firstly from 5 to 10 minutes at 112° C., then 5 minutes at 165° C. and finally 15 minutes at about 330° C.

Such a procedure gives a hydrophobic, mechanically stable gas diffusion electrode having a pore diameter of about 10 $\mu$m. The surface roughness of the electrode is of the same order of magnitude.

EXAMPLE 3

10 g of a 40% strength formaldehyde solution are mixed with 7.3 g of resorcinol, and to this are added 0.9 g of a 0.0992N sodium carbonate solution and 19.55 g of water.

This solution is used to impregnate an aramid fiber nonwoven lying on a glass plate. In order to achieve a defined specimen thickness, a ring of polytetrafluoroethylene is placed around the impregnated nonwoven. The nonwoven is then covered, according to the sandwich principle, with a second glass plate. The specimen is then stored in a closed container with exclusion of air for about 24 hours at room temperature. After further storage for about 24 hours at about 50° C., the specimen gels. The specimen is then allowed to age for from 1 to 3 days at a temperature of about 90° C., and the liquid in the pores, i.e. the water, is subsequently replaced by acetone. The specimen is then dried subcritically at a temperature of about 50° C., resulting in evaporation of the liquid present in the pores to give a xerogel. The dried specimen is subsequently pyrolyzed at about 1050° C. in an argon atmosphere (duration: about 2 hours). The subsequent hydrophobicization is carried out in the same way as in Example 1.

Such a procedure gives a hydrophobic, mechanically stable gas diffusion electrode having a pore diameter of a few 100 nm and a smooth outer surface. The nonwoven is very readily integrated into the xerogel matrix.

EXAMPLE 4

A gas diffusion electrode is produced by a method analogous to Example 1 but using a polyamide membrane (mean pore diameter: about 0.4 $\mu$m) in place of a cellulose membrane. The replacement of the liquid after aging is omitted in this case.

This gives a hydrophobic, mechanically stable gas diffusion electrode having a pore diameter of a few 100 nm and a mirror-smooth surface.

EXAMPLE 5

10 g of a 40% strength formaldehyde solution are mixed with 7.3 g of resorcinol, and to this are added 0.9 g of a 0.0992N sodium carbonate solution and 19.55 g of water. A polyester filter (mean pore diameter: about 75 $\mu$m) is impregnated with this solution and subsequently sprayed again with the solution. The filter is then laid, according to the sandwich principle, between two parallel, planar glass plates and stored in a closed container with exclusion of air for about 24 hours at room temperature. After further storage for about 24 hours at about 50° C., the specimen gels. The specimen is then allowed to age from 1 to 3 days at a temperature of about 90° C. for. The specimen is subsequently dried supercritically in an autoclave using carbon dioxide; this gives an aerogel. The dried specimen is subsequently pyrolyzed at about 1050° C. in an argon atmosphere (duration: about 2 hours). The subsequent hydrophobicization is carried out in the same way as in Example 1.

Such a procedure gives a hydrophobic, mechanically stable gas diffusion electrode having a pore diameter of about 0.1 $\mu$m. The surface roughness of the electrode is of the same order of magnitude.

We claim:

1. A porous carbon gas diffusion electrode for a fuel cell, comprising a pyrolysis product of a composite of an organic aerogel or xerogel and a reinforcing skeleton consisting at least in part of organic material, said composite being hydrophobicized.

2. The gas diffusion electrode according to claim 1, having a smooth surface and a pore diameter in the range from 0.01 $\mu$m to 10 $\mu$m.

3. The gas diffusion electrode according to claim 1, wherein the organic material has substructures which can form hydrogen bonds.

4. The gas diffusion electrode according to claim 1, wherein the organic material is selected from the group consisting of cellulose, polyamide, polyester or viscose staple fibers.

5. The gas diffusion electrode according to claim 4, wherein the polyamide organic material is an aromatic polyamide.

6. The gas diffusion electrode according to claim 1, wherein the reinforcing skeleton comprises at least 80% by weight of organic material.

7. The gas diffusion electrode according to claim 1, wherein the reinforcing skeleton has a pore radius gradient.

8. The gas diffusion electrode according to claim 7, wherein the pore radius is greater on the side of the electrode in contact with the gas supply than on the side of the electrode in contact with the electrolyte.

9. The gas diffusion electrode according to claim 1, wherein the organic aerogel or xerogel is a phenol/aldehyde condensation polymer.

10. The gas diffusion electrode according to claim 1, wherein the relative proportions of the organic aerogel or xerogel and the reinforcing skeleton are in the range from 9:1 to 1:9 by weight.

11. A process for producing a porous carbon gas diffusion electrode for a fuel cell according to claim 1, comprising the steps of:
   providing a composite of an organic aerogel or xerogel and a reinforcing skeleton consisting at least in part of organic material;
   pyrolyzing the composite under protective gas; and
   hydrophobicizing the composite.

12. The process according to claim 11, wherein the pyrolysis is carried out at a temperature in the range from 600 to 2000° C.

13. The process according to claim 11, wherein the organic aerogel or xerogel is formed in presence of the reinforcing skeleton by condensation polymerization of an alkaline solution of reactive monomers.

14. The process according to claim 13, wherein the reactive monomers comprise at least one phenol and at least one aldehyde.

15. The process according to claim 11, wherein the reinforcing skeleton is impregnated with a basic solution of aerogel- or xerogel-forming monomers, the impregnated reinforcing skeleton is gelled and aged, the resulting composite is dried and subsequently pyrolyzed under protective gas.

16. The process according to claim 15, wherein the liquid in the pores is replaced prior to drying by a liquid having a low surface tension.

17. The process according to claim 15, wherein drying is carried out subcritically.

18. The process according to claim 11, in which hydrophobicization is performed with a perfluorinated polymer.

19. The process according to claim 18, in which the perfluorinated polymer is a copolymer of tetrafluoroethylene and perfluoro-2,2-dimethyldioxole.

20. The process according to claim 11, in which hydrophobicization is performed by silylation.

21. The process according to claim 20, in which silylation is performed with trimethylchlorosilane.

22. A carbonizable composite affording upon pyrolysis a porous carbon gas diffusion electrode, comprising an organic aerogel or xerogel and a reinforcing skeleton consisting at least in part of organic material, such that the volumetric shrinkage upon pyrolysis of the organic aerogel or xerogel and the reinforcing skeleton are within plus or minus 10% of one another.

23. The composite according to claim 22, wherein the organic material has substructures which can form hydrogen bonds.

24. The composite according to claim 22, wherein the organic material is selected from the group consisting of cellulose, polyamide, polyester or viscose staple fibers.

25. The composite according to claim 24, wherein the polyamide organic material is an aromatic polyamide.

26. The composite according to claim 22, wherein the reinforcing skeleton comprises at least 80% by weight of organic material.

27. The composite according to claim 22, wherein the reinforcing skeleton has a pore radius gradient.

28. The composite according to claim 27, wherein the pore radius is greater on the side of the electrode in contact with the gas supply than on the side of the electrode in contact with the electrolyte.

29. The composite according to claim 22, wherein the organic aerogel or xerogel comprises a phenol/aldehyde condensation polymer.

30. The composite according to claim 22, wherein the relative proportions of the organic aerogel or xerogel and the reinforcing skeleton are in the range from 9:1 to 1:9 by weight.

* * * * *